United States Patent [19]
Reichard

[11] Patent Number: 5,830,308
[45] Date of Patent: Nov. 3, 1998

[54] METHOD FOR FABRICATION OF STRUCTURE ADHESIVE JOINTS

[75] Inventor: Ronnal P. Reichard, Melbourne Village, Fla.

[73] Assignee: Applied Composites Technologies, West Melbourne, Fla.

[21] Appl. No.: 683,378

[22] Filed: Jul. 18, 1996

[51] Int. Cl.⁶ .................................................. B32B 33/00
[52] U.S. Cl. ........................................ 156/291; 156/157
[58] Field of Search .................................. 156/292, 291, 156/290, 157, 304.1

[56] References Cited

U.S. PATENT DOCUMENTS

| | | | |
|---|---|---|---|
| 1,678,218 | 7/1928 | Gruss | 156/99 X |
| 3,868,801 | 3/1975 | Weiner | 52/309.5 |
| 4,651,382 | 3/1987 | Krolick | 156/305 X |
| 4,898,635 | 2/1990 | Kobari | 156/245 |
| 5,273,606 | 12/1993 | Greve et al. | 156/216 |
| 5,391,411 | 2/1995 | Rowland | 428/34 |

FOREIGN PATENT DOCUMENTS 2710-942  9/1978  Germany.

*Primary Examiner*—Francis J. Lorin
*Attorney, Agent, or Firm*—Quarles & Brady

[57] ABSTRACT

A method is disclosed for bonding structural elements together by injecting a liquid adhesive into a flow channel created by two strips of double sided adhesive tape and the two structural elements to be joined. The double sided adhesive tapes hold the structural elements in position while the adhesive is cured, thus forming a permanent bond between the structural elements.

14 Claims, 5 Drawing Sheets

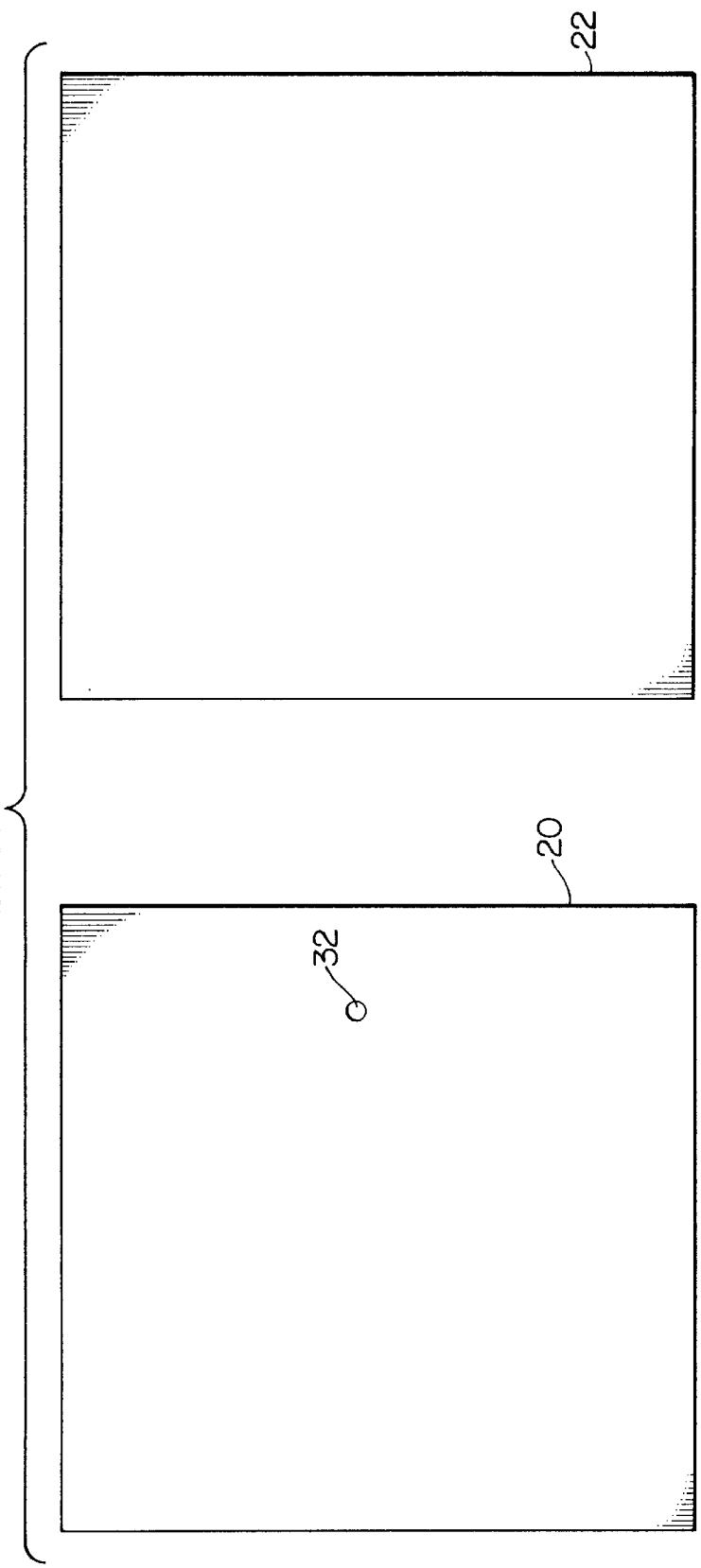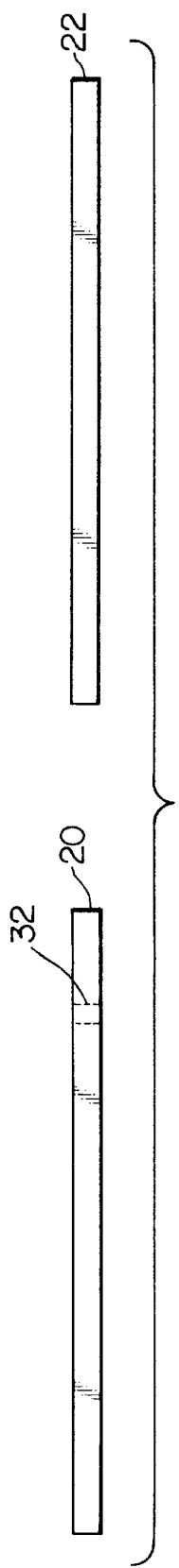

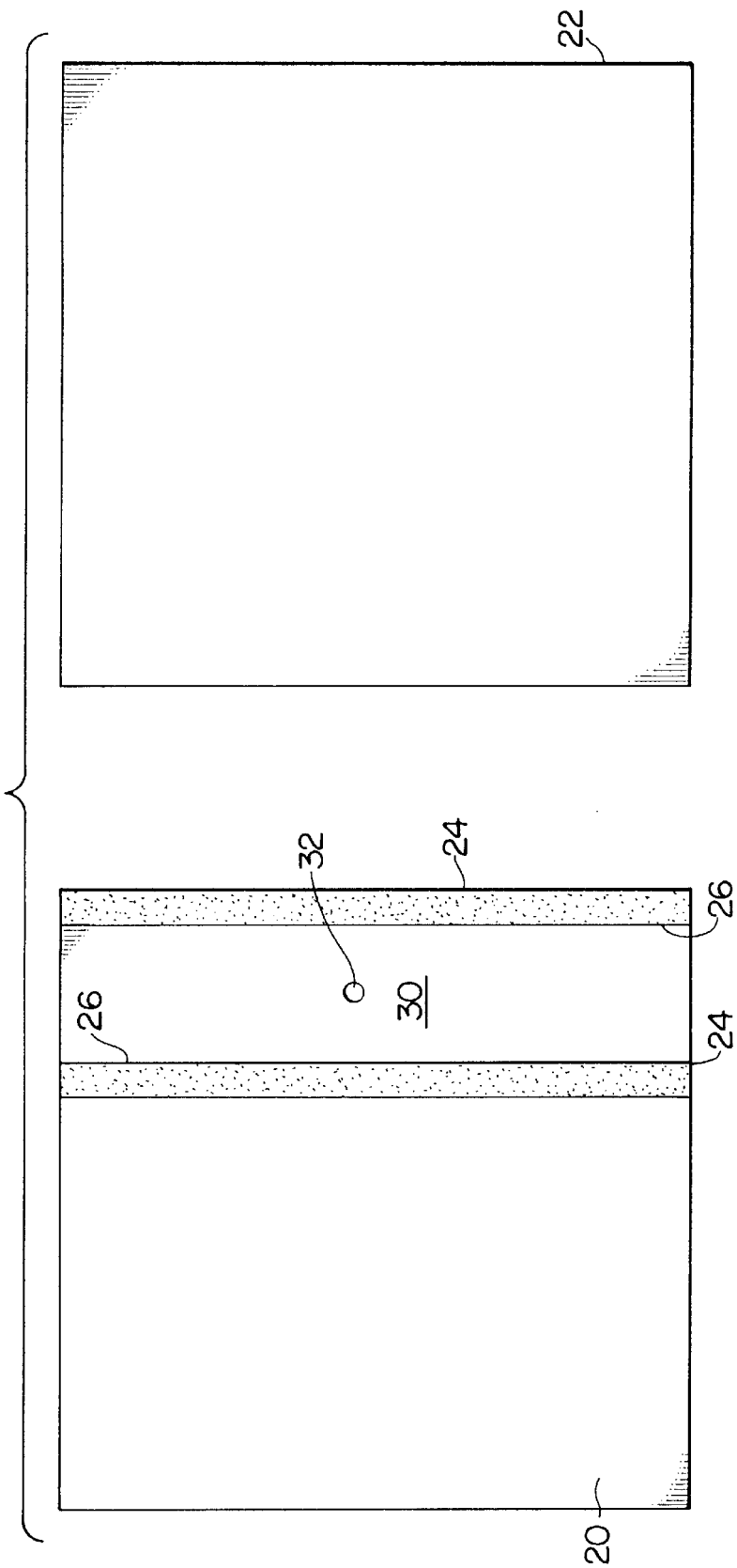

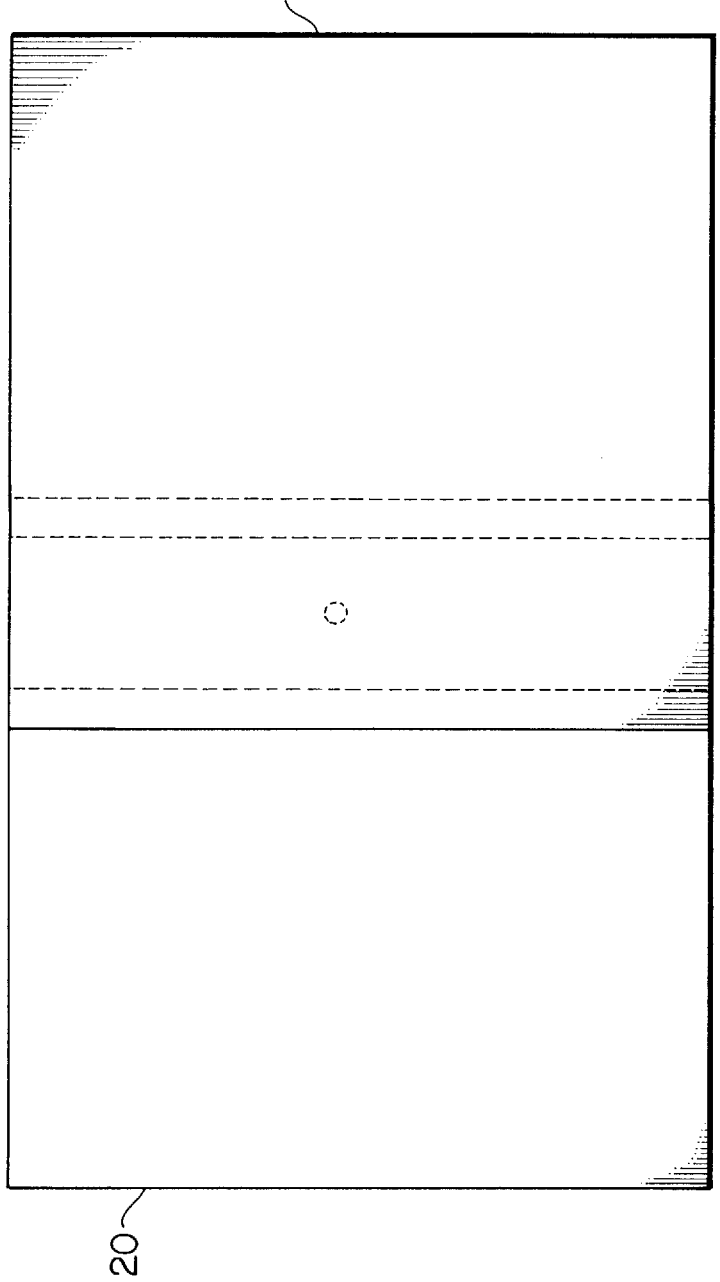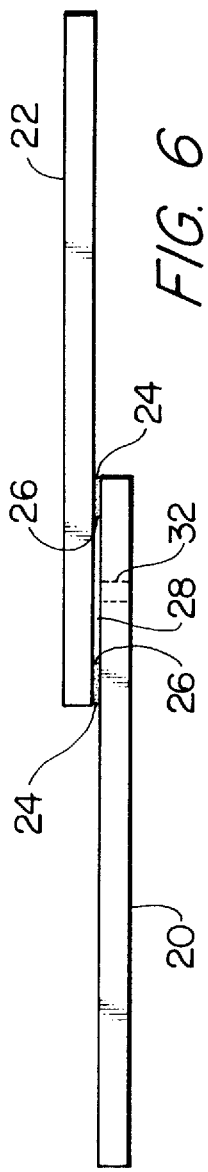

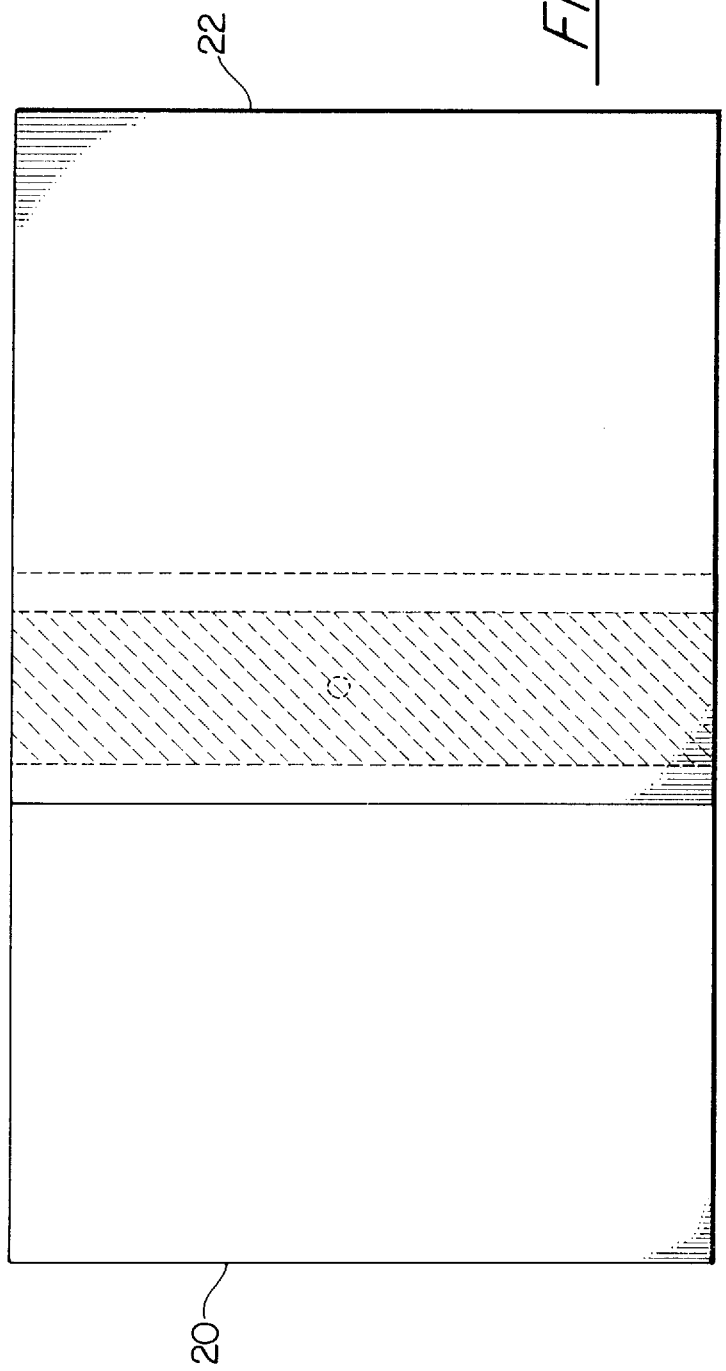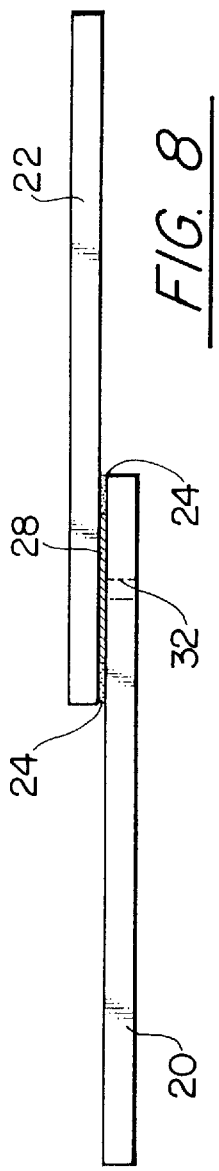

METHOD FOR FABRICATION OF STRUCTURE ADHESIVE JOINTS

BACKGROUND OF THE INVENTION

1. Field of the Invention

This invention relates to bonding methods for joining together structural elements to form a completed structure. The method permits structural elements formed from materials such as metals, plastics, or composites to be maintained securely in position while a permanent adhesive bond is allowed to form.

2. Description of the Prior Art

Structural elements can be joined together using a wide variety of methods including mechanical systems, welding systems, adhesive systems and various combinations of same. However, certain types of structural elements have been found to be particularly suitable for attachment to one another by adhesive means.

One example of such an element is a thin walled sheet metal panel formed from material such as steel, aluminum or other metal. Conventional means for attaching such panels to a frame or support structure have been found to be problematic. For example, attempts to weld such thin wall metal panels tends to result in warpage of the panel caused by heat and locked in mechanical or thermal stress. Further, it has been found that it is difficult to obtain a full strength weld due to the relatively small weld area available. Finally, welding such thin wall metal panels has been found to have an adverse effect on the integrity of the panel, including stiffness and strength. Similarly, attaching such thin walled sheet metal panels to a frame or support structure by means of rivets has been found to have certain drawbacks. The use of rivets results in stress concentrations in the panel which lead to fatigue failures. Adhesive bonding methods avoid this problem by spreading stresses over a larger bond area, with the result that overall strength and fatigue life are enhanced greatly.

Another example of structural elements found to be particularly suitable for attachment to one another by adhesive means would be elements formed from composite materials. Composite materials include any of a class of materials which are comprised of a combination of two or more materials, e.g. fiber reinforced plastic wherein high strength fibers are embedded in a plastic resin. Composite structural elements can be attached to one another by means of adhesives or by use of mechanical fasteners such as bolts, nails, screws or clips. However, these types of structural elements typically suffer from a common problem as concerns the use of such mechanical fastening means. Specifically, they do not react well to point loads, which are inherent in the use of mechanical fasteners of the kind described above. Also, composite structures formed, for example, from fiber reinforced plastic tend to be very sensitive to notching or drilling, which creates a flaw or weak spot in the element which can cause structural failures. Use of adhesive bonding techniques advantageously avoids such point loading and provides instead for distributed loading.

In their simplest form, adhesive structural joints are typically formed by (1) applying a bead of adhesive to one surface of a structural part or panel (2) placing a second structural part or panel onto the adhesive bead, and (3) compressing the structural parts or panels together so that the adhesive is disbursed over most or all of the joint surface. The joint is then secured (usually by clamping) until the adhesive has cured. This method has the advantage of requiring little, if any, pre-shaping of the structural parts or panels and is therefore most economical.

More advanced structural joints are formed by injecting adhesive into a channel between two structural parts or panels. This channel is typically provided in one or both of the parts or panels to be bonded. The channel may be pre-formed on the part or panel if it is known specifically how the pre-fabricated panel is intended to be used in a particular completed structure. Otherwise, a standard panel must be custom shaped and fitted with a suitable channel to accommodate its use in a particular application. This presents a particular problem for the purposes of using standard structural parts or panels in a wide variety of applications.

Other shortcomings associated with bonding techniques of the prior art include difficulties in: 1) clamping or taping the parts or panels in place while the adhesive cures; 2) controlling the thickness and width of the applied adhesive forming the bond line (which is critical to optimize strength of the joint); 3) limiting the adhesive to the joint area (adhesive "escaping" through the edges of the seams is wasted and often must be removed manually); 4) waiting for the adhesive to cure before proceeding with other fabrication steps. Expensive equipment, labor intensive procedures, extra adhesive (an expensive product) and increased fabrication time are typically required to address these difficulties.

The need to clamp parts or panels together in the case of prior art bonding techniques is a substantial disadvantage, often requiring installation of mechanical fasteners and/or use of expensive custom clamping devices to secure the parts or panels while the adhesive cures. Fast curing adhesives are available which minimize the need for clamping and fastening of panels. However, such adhesives severely limit the time to apply the adhesive and position the parts. This limitation typically increases rework and/or reject rates. An external curing agent, such as heat, can also be used to accelerate the cure, but the heating equipment and energy can be expensive, and the heat may adversely effect the parts being bonded, especially plastic, fiberglass or painted parts. Room temperature cure adhesives are commonly used for many applications, but the cure time is typically on the order of hours.

Likewise, the need for tight control over bond line thickness and width tend to increase the cost of a completed structure formed from elements such as composite parts and panels. Maintaining carefully specified tolerances for bond line thickness and width is essential, however, for obtaining the optimum structural performance of the adhesive. Such quality control requires accurate positioning of the parts, including the spacing between the parts, and controlled application of the adhesive. The time, labor, and equipment necessary to obtain the required accuracy represent a significant portion of the cost to produce an adhesive joint.

Finally, the need to limit adhesive to the joint area, as noted above, also tends to add to the cost of producing a completed adhesive joint. Adhesive of the type commonly used for joining composite panels include Plexus brand acrylic adhesive which is commercially available from ITW, Inc. of Danvers, Mass.; Scotch-Weld brand epoxy adhesive from 3M Company of Minneapolis, Minn.; or Gen-Tac brand urethane adhesive which is commercially available from GenCorp of Mogadore, Ohio. In their uncured state, such adhesives tend to flow in any direction in which they are not confined. As a result, the adhesive tends to escape through the seams of the joint. This escaped adhesive must thereafter be removed and discarded. In an average bonding job, 20 to 50 percent wastage of adhesive is typical, and substantially increases costs.

Further, removal of adhesive is generally effected manually with rags and solvents, thereby creating hazardous waste. Removal of the adhesive after it has cured eliminates the hazardous waste, but requires considerably more labor and may require refinishing of the panel or part surface.

Adhesive tapes with adhesive on both sides (similar to double-sided carpet tape) are also used to make structural joints when forming composite structures. However joints formed using such adhesive tapes are usually of much lower strength than the adhesive joint described above. Accordingly, such methods have proved unsatisfactory for creating a permanent, high strength, structural bond.

It would be desirable to provide a method of assembling structural parts and panels, and particularly parts and panels formed from composite materials, which is efficient, inexpensive and allows positional adjustment of parts before the adhesive is applied. It would also be desirable to provide a method of joining structural parts and panels which is environmentally friendly, and avoids or minimizes the creation of hazardous waste.

SUMMARY OF THE INVENTION

It is an object of the invention to provide a method for bonding a plurality of structural elements together to form a completed unit. According to the method, a first strip of double sided adhesive tape is applied to a predetermined bonding area of a first structural element. At least one additional strip of double sided adhesive tape is also applied to the predetermined bonding area of the first structural element. The additional strip of double sided adhesive tape is preferably spaced apart from the first strip of double sided adhesive tape so as to define a flow channel between the two strips of tape. Once the flow channel has been defined using the tapes, a second structural element is positioned on the first structural element in the predetermined bonding area so that the second structural element at least partially covers the flow channel. Placing the second structural element on the adhesive tape causes the first and second structural elements to be temporarily maintained in position relative to one another until they can be permanently bonded. Finally, an adhesive is injected into the flow channel, causing the flow channel to become substantially filled with the adhesive. The adhesive is allowed to cure to form the final completed structure. According to the invention, the process as described herein can be repeated as necessary with additional structural elements to form larger, more complex structures. In a preferred embodiment, if the structure to be created is large and complex, the taping and positioning steps are performed for each of the structural elements before the step of injecting the adhesive. The adhesive tape does not form a permanent or particularly strong bond. Therefore, the relative position of each of the structural elements can be adjusted prior to final injection of adhesive into the flow channels to form a permanent bond. Further, the thickness of the bond line is determined and controlled by the thickness of the adhesive tape, and the width of the bond is defined by the distance between the strips of adhesive tape.

BRIEF DESCRIPTION OF THE DRAWINGS

There are shown in the drawings embodiments which are presently preferred, it being understood, however, that the invention is not limited to the precise arrangement and instrumentalities shown, wherein:

FIG. 1 is a side view of a pair of structural elements to be joined together using the present invention.

FIG. 2 is an end view of the pair of structural elements shown in FIG. 1.

FIG. 3 is side view of the pair of structural elements shown in FIG. 1 wherein a flow channel has been formed on one panel by a pair of adhesive tapes.

FIG. 4 is an end view of the pair of structural elements shown in FIG. 3.

FIG. 5 is a side view of the pair of structural elements shown in FIG. 3 with the two panels temporarily attached to each other by means of adhesive tape.

FIG. 6 is an end view of the pair of structural elements shown in FIG. 5 prior to injection of adhesive.

FIG. 7 is a side view of the pair of structural elements shown in FIG. 5 after injection of liquid adhesive.

FIG. 8 is an end view of the pair of structural elements shown in FIG. 5 after injection of liquid adhesive.

DETAILED DESCRIPTION OF THE PREFERRED EMBODIMENT

Figure 10:
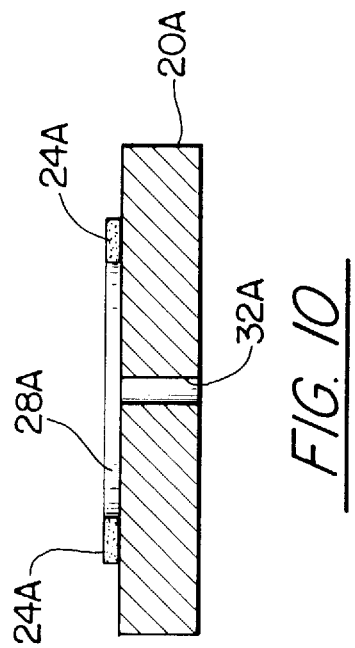
FIG. 10 is a sectional view of the structural element in FIG. 9, taken along line 10—10.
Figure 9:
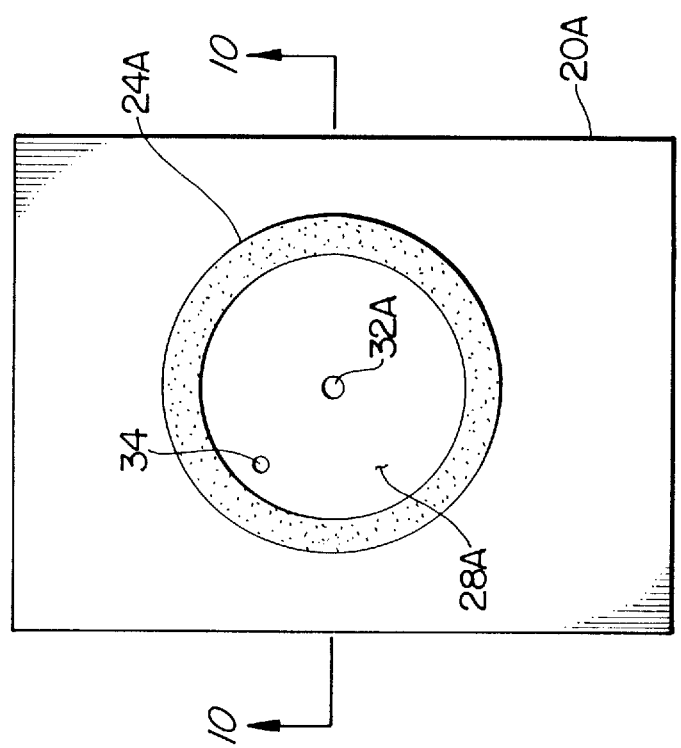
FIG. 9 is a side view of a structural element onto which a double sided adhesive gasket has been applied.

The method according to the present invention provides a new and advantageous method for bonding together two or more structural panels to form a completed unit. Referring to FIGS. 1 and 2 there is shown a pair of structural elements 20 and 22 which are to be joined together using the method of the present invention. Structural elements 20 and 22 can be any type of rigid structural material to be bonded including wood, plastic or metal. In a preferred embodiment however the method is used with panels formed from a composite material. For the purposes of the within specification, composite materials include, but are not limited to, fiber reinforced plastics such as fiberglass, carbon/epoxy or Kevlar brand fiber reinforced laminates. The method of the invention is particularly well suited for use with composite materials because of their light weight which allows the separate structural elements to be temporarily bonded together using adhesive tape, as described below. The structural elements shown in FIGS. 1–10 are flat panels. It should be understood however, that the method according to the invention is not so limited. Instead, the method may be used with any form or shape of structural element, such as I-beams, box beams, T-beams, panels etc.

As shown in FIGS. 3 and 4, double side adhesive tapes 24 are applied to the surface of the structural element 20 within or along the boundary of a predetermined bonding area 30. Double sided adhesive tapes 24 are suitably chosen for the particular type of materials comprising structural elements 20, 22 on which the tape is to be used.

Suitable tapes must be formed from a base material and adhesive such that they are strong enough to support the weight of the part and to withstand the pressure associated with the adhesive injection process. Suitable base materials for such tape include any type of flexible material which is capable of accepting a contact adhesive on its surface and also capable of preventing the passage therethrough of adhesive. Suitable base materials include, but are not limited to, polyethylene foam, urethane foam, or acrylic foam.

The tape adhesive is preferably a contact adhesive to provide instantaneous bonding. Such adhesives include rubber, urethane, acrylic, or epoxy based materials.

Examples of suitable commercially available double sided adhesive tapes include Scotch brand type 4466 polyethylene foam tape with rubber based adhesive; Scotchmount type 4016 urethane foam adhesive tape; Scotch VHB type 4956 adhesive tape, all of which are commercially available from 3M Company of Minneapolis, Minn.

In general, the heavier the material is which comprises the structural elements to be bonded, the greater is the adhesive strength which is required of the tapes 24. In a preferred embodiment, the tapes 24 are chosen so that the structural elements 20, 22 are securely maintained in position relative to one another, while still permitting the elements to be temporarily separated and repositioned, if necessary. This ability to permit repositioning of structural elements which have been temporarily bonded using the double sided adhesive tape 24 is particularly important where several structural elements are to be fitted together and may require positional adjustment prior to permanent bonding.

As shown in FIG. 6, double sided adhesive tapes 24 form a flow channel 28. In FIG. 6, the channel is defined by the side walls 26 of the tape strips and the surface of the structural element 20 comprising the bonding area 30. Significantly, it should be noted that the thickness of the double sided adhesive tape 24 is the primary factor determining the depth of the flow channel. Thus, the method according to the invention allows a user to customize the channel depth to suit any specific application.

The desired tape thickness chosen for use with a particular application depends partly on the type of adhesive to be used. Each adhesive has an optimum thickness for maximum strength. Such thickness typically ranges between 0.05 mm to 10 mm. Accordingly, the tape selected preferably has a thickness within this range and is advantageously chosen to have a thickness which substantially matches the optimum thickness of the adhesive for maximum strength. In choosing tape thickness, however, consideration must also be given to the viscosity of the adhesive which is to be used to form a permanent bond and the length of the joint, to ensure that the adhesive can flow down the entire length of the flow channel defined by the double sided tapes.

In FIGS. 1–8, the double sided adhesive tapes are shown positioned parallel to one another and extend along the entire length of the predetermined bonding area 30. Significantly, however, the method according to the invention is not so limited in this regard. Instead, the double sided adhesive tapes 24 may positioned in any suitable manner so as to define a flow channel 28 suitable for use in a particular application and a particular set of circumstances. Further, although only two parallel tapes 24 are shown in FIGS. 1–8, additional tapes 24 could be provided at opposite ends of the bonding zone 30 to fully or partially enclose the bonding area.

The width of the flow channel 28 may be broadened or narrowed to vary the strength of the joint. The tapes 24 may be applied to continue the flow channel 28 around corners and along curved surfaces. In an alternative embodiment, the adhesive tapes 24 may be applied to define any shape area. In this regard, it should be noted that in place of tape strips, a preformed double-sided adhesive gasket 24A may also be used to define the flow channel 28A. See FIGS. 9 and 10. For example the double sided adhesive gasket 24A can define a circular or rectangular outline which, when applied to the structural element 20A, defines a bond area. In such cases, an air escape port 34 is preferably provided to allow displacement of air from the bond area when adhesive is injected therein via adhesive injection port 32A.

Once the double sided adhesive tapes 24 have been applied to the structural element 20, the structural element 22 to which the element 20 is to be attached, is placed in position generally covering the flow channel. See FIGS. 5 and 6. Placement of the structural elements 20, 22 in this position causes the two elements to become temporarily attached to one another by virtue of the adhesive properties of the tapes 24. As noted above, the adhesive tapes chosen for a particular application are preferably such as to allow the attached elements 20, 22 to be securely held together but also separated from one another if necessary so that their relative positions may be adjusted. Once again, however, the invention is not so limited in this regard and other types of adhesive tapes may also be used.

As an aside, it should be noted that while it is convenient to place double sided tapes 24 both on a single structural element, such as structural element 20, the invention is not so limited. For example, it is possible to place one double sided tape on structural element 20 and a second double side tape 24 on structural element 22 so that the flow channel is not formed until the two elements are secured together as described above.

Once the structural elements 20, 22 are properly positioned and securely fastened together by means of adhesive tapes 24, an adhesive is injected into the flow channel. See FIGS. 7 and 8. The adhesive can be injected through an opening between the two elements where the adhesive tape has not been applied, e.g. at the exposed edge of the channel 28 as shown in FIG. 8. In a preferred embodiment, however, at least one of the structural elements 20, 22 is provided with an adhesive injection port 32. Adhesive injection port 32 may be comprised of any suitable opening in the surface of the structural elements 20, 22 capable of permitting the injection of adhesive from outside the element, to the interior of the flow channel 28. If necessary, more than one adhesive injection port may be provided.

In a preferred embodiment of the invention means are provided to allow air contained within the flow channel 28 to escape when adhesive is injected therein. The venting system provided may be a simple gap in the adhesive tape, such as that shown at the exposed edge of channel 28 in FIG. 8, whereby the end of the channel is left open. Alternatively, a specially provided vent such as vent port 34A may be provided, which passes through the surface of one of the structural elements 20, 20A, 22.

According to the invention, the adhesive injected into the flow channel is preferably chosen to suit the particular type of material from which the structural elements 20, 22 are formed. For example, the adhesive injected into the flow channel preferably has a viscosity suitable for injection into a relatively narrow flow channel. Thus, extremely thick or viscous adhesives are less well suited for this application. Further, the injected adhesive should be chosen so as to provide sufficient adhesion to the structural element to satisfy the strength requirements for a particular application. Finally, the adhesive should be capable of curing, either as a result of its own chemistry or by other means. Suitable adhesives for use in the present invention include, but are not limited to, Plexus brand acrylic adhesive which is commercially available from ITW, Inc. of Danvers, Mass.; Scotch-Weld brand epoxy adhesive from 3M Company of Minneapolis, Minn.; or Gen-Tac brand urethane adhesive which is commercially available from GenCorp of Mogadore, Ohio.

The method described herein has the following advantages: 1) The use of the adhesive tape provides a simple, low cost method of securing the parts or panels together prior to the application of the adhesive. This allows multi-part, multi-joint structures to be "tacked" together quickly, checked for accuracy, and then permanently bonded at some later time by injecting the adhesive; 2) The adhesive tape provides a consistent bond line thickness and width, thus providing optimum structural performance of the joint; 3)

The adhesive tape effectively seals the edges of the joint, eliminating adhesive waste through drips and spills, and eliminates expensive clean up or rework; 4) The adhesive tape temporarily secures the joint, allowing other fabrication steps to proceed before the adhesive is injected or while the adhesive cures.

Examples of structural applications for the present invention are: bonding panels and frames together to form a frame and panel style building; bonding panels and frames together to form a superstructure for a ship; bonding a hull liner, deck and other small parts during the construction of a boat; bonding panels and frames together to form a trailer (either a cargo trailer or a recreational trailer); bonding body panels to the framing structure of a car or truck; bonding liners or inner panels to body panels for cars and trucks.

As the invention can be embodied in other specific forms without departing from the spirit or essential attributes thereof,. reference should be made to the following claims, rather than to the foregoing specification, as indicating the scope of the invention.

We claim:

1. A method for bonding first and second structural elements together comprising:
   A) applying a first strip of double sided adhesive tape to a predetermined bonding area of said first structural element;
   B) applying a second strip of double sided adhesive tape to a predetermined bonding area of one of said first and second structural elements;
   C) placing said second structural element to be bonded on said first structural element so that said first and second strips of double sided adhesive tape form a flow channel between said first and second structural elements;
   D) injecting an adhesive into the flow channel until said flow channel has been substantially filled with said adhesive, the first and second strips of double sided adhesive providing the sole means of attachment of said first and second structural elements during injection of adhesive into said flow channel; and
   E) allowing the adhesive to cure.

2. The method according to claim 1 wherein at least one of said structural elements is a composite panel.

3. The method according to claim 2 wherein said composite panel is comprised of a fiber reinforced plastic.

4. The method according to claim 1 wherein the thickness of said double sided adhesive tape is varied to control the depth of the flow channel.

5. The method according to claim 1 wherein said double sided adhesive tape has a thickness which is between about 0.05 mm to 10 mm.

6. The method according to claim 1 wherein said double sided adhesive tape is formed from a base material comprised of at least one of polyethylene foam, urethane foam, or acrylic foam.

7. The method according to claim 1 wherein a tape adhesive applied to said double sided adhesive tape is comprised of at least one of a rubber, urethane or acrylic based contact adhesive.

8. The method according to claim 1 comprising the additional step of providing an adhesive injection port in at least one of said first and second structural elements within the boundaries defined by said first and second strips of double sided adhesive tape, said injection port passing through the structural element and permitting the passage of adhesive therethrough and into the flow channel.

9. The method according to claim 8 wherein said adhesive is injected into said flow channel through said adhesive injection port.

10. A method for bonding a plurality of structural elements together comprising:
    A) applying a double sided adhesive gasket to a predetermined bonding area of a first structural element so as to define a flow channel;
    C) placing at least a second structural element to be bonded on said first structural element so that said second structural element at least partially covers said flow channel and adheres to said double sided adhesive gasket;
    D) injecting an adhesive into the flow channel until said flow channel has been substantially filled with said adhesive, the double sided adhesive gasket providing the sole means of attachment of said first and second structural elements during injection of adhesive into said flow channel; and
    E) allowing the adhesive to cure.

11. A method for forming a completed structure from a plurality of structural elements:
    A) applying a first strip of double sided adhesive tape to a predetermined bonding area of a first structural element;
    B) applying at least one additional strip of double sided adhesive tape to said predetermined bonding area of said first structural element, said at least one additional strip of double sided adhesive tape spaced apart from said first strip of double sided adhesive tape so as to define a flow channel therebetween;
    C) placing a second structural element to be bonded on said first structural element so that said second structural element at least partially covers said flow channel and adheres to said first and second double sided adhesive tapes;
    D) repeating steps A–C for each additional structural element comprising the completed structure until all of the structural elements have been secured in position by means of said double sided adhesive tapes;
    D) injecting an adhesive into the flow channels formed by said plurality of structural elements until each of said flow channels has been substantially filled with said adhesive; and
    E) allowing the adhesive to cure to form the completed structure.

12. A method for forming a structural assembly having a plurality of overlapping panels, comprising the steps of:
    A) providing a plurality of panels each having opposing major surfaces, at least some of the panels having a temporary adhesive attachment means disposed upon at least one major surface thereof;
    B) positioning said panels in a face-to-face relationship such that the major surfaces of said panels are substantially parallel, said temporary adhesive attachment means holding said adjacent overlapping panels in close and intimate contact without external clamping, and forming bonding regions therebetween;
    C) injecting a permanent adhesive into said bonding regions; and
    D) curing said permanent adhesive.

13. A method as described in claim 12, wherein said plurality of panels are composite panels.

14. A method as described in claim 12, wherein said temporary adhesive means is a double-sided adhesive tape.

* * * * *